Feb. 21, 1939.　　　　　E. L. ROSE　　　　　2,148,277
POWER TRANSMISSION
Filed April 4, 1936
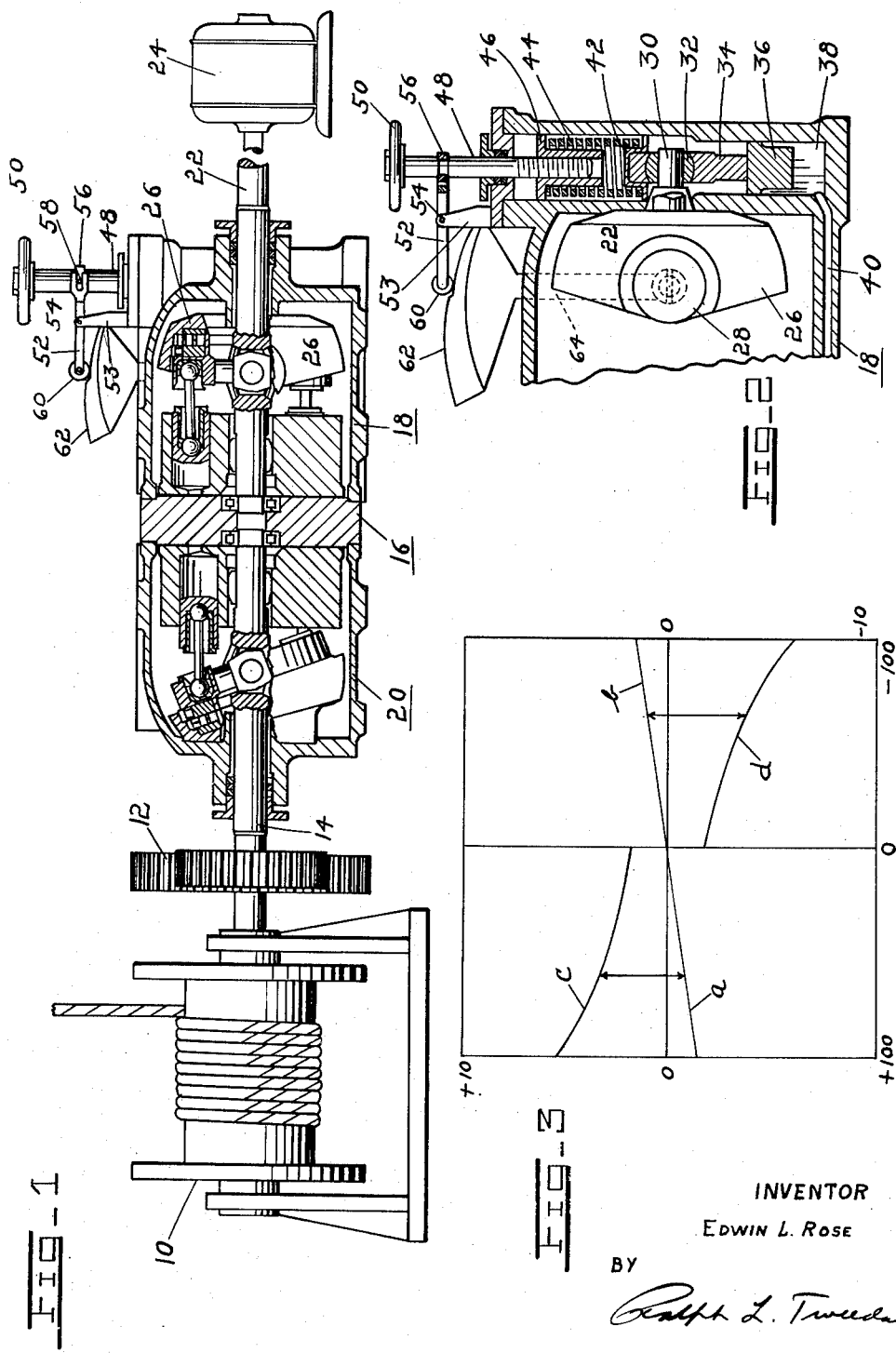
INVENTOR
EDWIN L. ROSE
BY
Ralph L. Tweedale
ATTORNEY Patented Feb. 21, 1939

2,148,277

UNITED STATES PATENT OFFICE 2,148,277

POWER TRANSMISSION

Edwin L. Rose, Waterbury, Conn., assignor to The Waterbury Tool Company, Waterbury, Conn., a corporation of Connecticut Application April 4, 1936, Serial No. 72,761

7 Claims. (Cl. 254—172)

This invention relates to power transmissions and more particularly to transmissions of the variable speed type wherein a fluid medium is circulated from a pump to a motor, the relative displacements of which may be varied. In adapting transmissions of this character to uses wherein a load device is driven at varying speeds in order to maintain a constant torque thereon, fluid pressure responsive means have been provided for varying the ratio of power transmission in such a manner that the working pressure is maintained constant. A constant working pressure produces a constant output torque on the motor end of the transmission only at a given speed. As the speed of the motor varies, however, the torque produced at a given fluid pressure likewise varies to a certain extent due to certain unavoidable losses in the power transmission which increase as the speed thereof increases.

If the load device upon which it is desired to maintain a constant torque be a winch such as a towing or mooring winch for use at sea or a winch for an airplane crane for hoisting planes from the water to the deck of a ship, it is desirable to maintain a constant cable tension under certain conditions of operation and the use of a pressure responsive control device presents many advantages by way of simplicity and directness in control linkages over a control device responsive directly to changes in cable tension. The principal drawback in the use of the pressure responsive control has been, however, the fact that such devices have heretofore failed to compensate for the varying losses in the power transmission at different speeds of operation.

It is an object of the present invention, therefore, to provide a variable speed power transmission and control therefor in which a constant torque may be maintained on a load device by means of a pressure responsive control device.

A further object is to provide a pressure responsive control device for a variable displacement pump and to incorporate therein means for varying the pressure response thereof in accordance with changes in displacement of the pump.

Further objects and advantages of the present invention will be apparent from the following description, reference being had to the accompanying drawings wherein a preferred form of the present invention is clearly shown.

In the drawing:

Fig. 1 is a side view partly in section of a winch and power transmission for driving the same embodying a preferred form of the present invention.

Fig. 2 is a fragmentary sectional view showing the control mechanism for the power transmission.

Fig. 3 is a diagram indicating the pressure conditions in operation of the device.

In the form of the invention illustrated a winch 10 is connected through gears 12 driven by the output shaft 14 of a variable speed hydraulic transmission generally designated as 16. The transmission is illustrated as of the well-known "Waterbury" type comprising a variable displacement pump 18 and a fixed displacement motor 20. An input shaft 22 of the pump 18 may be driven by a suitable prime mover, for example a constant speed electric motor indicated at 24. The pump 18 includes a tilting box 26 illustrated in neutral or zero displacement position and which may be tilted about the axis of its trunnions 28 (Fig. 2) in either direction from neutral position whereby the displacement of the pump 18 may be varied and the direction of fluid flow therefrom may be reversed.

The tilting box carries an operating arm 30 to which is secured, by means of a pivoting and sliding connection at 32, a stem 34 carrying a piston 36 at its lower end, adapted to reciprocate in a cylinder 38. Cylinder 38 is in communication by means of conduit 40 with the side of the fluid circulating system which is under pressure when the winch 10 is operated to reel in cable. The upper end of the stem 34 carries a spring plate 42 against which the lower end of a spring 44 abuts. The upper end of the spring 44 abuts a movable spring plate 46 adjustably secured to a sliding stem 48, the upper end of which carries a handwheel 50 for adjusting the position of the spring plate 46 on the stem 48.

A lever 52 is pivoted to a bracket 53 at 54 and has one end bifurcated to embrace a collar 56 rotatably mounted in a groove on the stem 48. The collar 56 carries a pair of pins 58 engaging slots in the bifurcated end of arm 52 whereby the lever 52 may move the stem 48 up and down, while permitting the stem to be rotated by the handwheel 50. The opposite end of the lever 52 carries a roller 60 which runs on a cam 62 carried by an arm 64 rigidly secured to one of the tilting box trunnions 28 which projects through the case of the pump for this purpose. The shape of the cam 62 is correlated to the torque efficiency of the transmission in a manner to vary the pressure of the spring 44 so as to maintain the cable tension on the winch 10 constant at any speed.

Referring to Fig. 3 in which percentage displacement of the pump 18 or the per cent of full speed of the shaft 14 is plotted horizontally and in which per cent variation from the theoretical pressure necessary to maintain a given tension on the winch cable at a standstill is plotted vertically; the lines "a" and "b" represent the pressure which would be maintained in the working circuit of a similar transmission in which the stem 48 is held stationary and the cam mechanism 52—60 omitted or rendered ineffective. Thus, at zero displacement the pressure may be maintained at theoretical value while as the displacement is increased (toward + 100%) in a direction to cause winding in of the cable, the pressure falls along the line "a" the slope of which is determined by the characteristic of the spring 44. Likewise as the displacement of the pump is increased in the opposite direction, (toward — 100%) the pressure would rise as indicated by the line "b" for the same reason.

The lines "c" and "d" indicate the pressure which it is necessary to maintain in the side of the working circuit connected to cylinder 38 in order to compensate for the transmission losses at different speeds and to maintain the cable tension on the winch 10 at a constant value. Thus for a given speed in a winding in direction the compensation necessary is shown by the arrows between lines "a" and "c", and for a given speed in a paying out direction the compensation necessary is shown by the arrows between lines "b" and "d". The shape of the cam 62 is so related to the shape of the curve "c—d" so that for any position of the tilting box 26, the pressure of the spring 44 will be maintained (at least to a practical approximation) at a value corresponding to the required pressure at the particular setting of the tilting box and speed of the winch 10.

In operation of the device the motor 24 is started and the pump 18 is caused to deliver fluid to the motor 20 which drives the output shaft 14 and through gears 12 drives the winch 10. The end of the cable is connected to a load to be pulled, for example a boat to be towed behind another on which the winch is mounted. With the cable slack and until the tension on the cable reaches the desired value, the working pressure in the transmission is low, permitting the piston 36 and stem 34 to descend to move the tilting box into full stroke in the winding-in direction. As soon as the tension in the cable reaches the desired value at which it is to be maintained constant, (which is determined by the adjusted setting of hand wheel 50) pressure increases in the cylinder 38 causing the piston 36 to move upwardly to bring the tilting box to neutral position.

Thereafter if the cable is pulled out by the load attached to the other end thereof, the pressure in cylinder 38 increases and the piston 36 moves upwardly to increase the displacement of the pump 18 in the direction to pay out cable. The amount of upward movement at any instant is automatically limited to that sufficient to maintain a working pressure in the transmission corresponding to the value indicated by the curve "d". Thus, as the tilting box 26 turns counterclockwise away from the position of Fig. 2, the cam 62 permits roller 60 to move downwardly so that shaft 38 and spring plate 36 move upwardly to decrease the force exerted by spring 44 on spring plate 42. The piston 36 accordingly moves upward farther than it would if the spring plate 46 were held stationary; so that the stroke of the pump 18 in a paying out direction is made greater than that theoretically necessary with a 100% efficient transmission and this added stroke compensates for the increased losses in the transmission at the particular speed of operation. In other words the necessary speed in a paying out direction is maintained without requiring the cable tension and the working pressure to build up substantially above the value maintained when the hoist drum is stationary. Likewise if the load attached to the end of the cable moves toward the winch 10, the pressure falls and piston 36 descends causing the pump to be moved into the required stroke and direction to wind in cable. As the tilting box is thus moved into stroke in a winding in direction, the cam 62 moves roller 60 upwardly, increasing the force exerted by spring 44 on spring plate 42 and causing the piston 36 to move downwardly farther than it otherwise would were the spring plate 46 held stationary. The stroke of the pump in a winding in direction is thus increased beyond that theoretically necessary, so as to compensate for the transmission losses at whatever speed the hoist is moving. The speed of the winch 10, therefore, always corresponds to the speed with which the load at the end of the cable approaches and recedes from the winch 10 and likewise the tension in the cable is maintained constant.

While the form of embodiment of the invention as herein disclosed, constitutes a preferred form, it is to be understood that other forms might be adopted, all coming within the scope of the claims which follow.

What is claimed is as follows:

1. In a variable speed fluid power transmission device the combination of a fluid pump unit, a fluid motor unit driven by the pump, at least one of said units including means for varying its displacement, means for driving the pump unit, pressure responsive means for varying the displacement of said one unit, and means for varying the response of said pressure responsive means to compensate for the transmission losses at different motor speeds.

2. In a variable speed fluid power transmission device the combination of a variable displacement pump, a fluid motor driven by the pump, means for driving the pump, and means for varying the speed of the fluid motor to maintain a substantially constant output torque comprising means for varying the displacement of the pump in response to pressure changes and means for varying the pressure response of the displacement varying means in accordance with the displacement of the pump and by an amount sufficient to compensate for the transmission losses at any speed of the motor.

3. A control device for a variable displacement pump comprising in combination, means for varying the pump displacement, pressure responsive means for moving the displacement varying means in one direction, resilient means for moving the displacement varying means in the opposite direction, and means operated concurrently with the displacement varying means for varying the force of said resilient means in accordance with changes in the displacement of the pump.

4. In a variable speed fluid power transmission device the combination of a variable displacement pump, a fluid motor driven by the pump, means for driving the pump, displacement regulating means for the pump tending to maintain a constant working pressure in the power transmission and means acting on said displacement regulating means for varying the pressure to which it regulates in accordance with changes in pump displacement.

5. In a variable speed fluid power transmission device the combination of a variable displacement pump, a fluid motor driven by the pump, means for driving the pump, displacement regulating means for the pump tending to maintain a constant working pressure in the power transmission, means acting on said displacement regulating means for varying the pressure to which it regulates in accordance with changes in displacement, said last named means acting to increase the pressure in one direction of motor movement and to decrease the pressure in the opposite direction by an amount sufficient to make up the torque lost due to inefficiencies in power transmission whereby the output torque is maintained constant.

6. In a hoisting device which includes a winch, and a cable wound on the winch, the combination of a fluid pump unit, a fluid motor unit driven by the pump and connected to drive the winch, at least one of said units including means for varying its displacement, means for driving the pump unit, pressure responsive means for varying the displacement of said one unit, and means for varying the response of said pressure responsive means to compensate for the transmission losses at different motor speeds.

7. In a hoisting device which includes a winch, and a cable wound on the winch, the combination of a variable displacement pump, a fluid motor driven by the pump and connected to drive the winch, means for driving the pump, and means for varying the speed of the fluid motor to maintain a substantially constant cable tension comprising means for varying the displacement of the pump in response to pressure changes and means for varying the pressure response of the displacement varying means in accordance with the displacement of the pump and by an amount sufficient to compensate for the transmission losses at any speed of the motor.

EDWIN L. ROSE.